(No Model.)

H. S. MAXIM.
ELECTRICAL METER.

No. 255,307. Patented Mar. 21, 1882.

Attest:
R. F. Barnes.
W. Frisby.

Inventor:
Hiram S. Maxim
by Parker W. Page,
Attorney.

UNITED STATES PATENT OFFICE.

HIRAM S. MAXIM, OF BROOKLYN, ASSIGNOR TO THE UNITED STATES ELECTRIC LIGHTING COMPANY, OF NEW YORK, N. Y.

ELECTRICAL METER.

SPECIFICATION forming part of Letters Patent No. 255,307, dated March 21, 1882.

Application filed July 20, 1881. (No model.)

*To all whom it may concern:*

Be it known that I, HIRAM S. MAXIM, of the city of Brooklyn, county of Kings, and State of New York, have invented certain new and useful Improvements in Electrical Meters, of which the following is a specification.

The object of this invention is to measure the amount of electrical current that has passed over or been withdrawn from a main line or conductor, in a system of supply for operating electrical apparatus, maintaining electric lights, and other purposes; and to this end it consists in certain novel constructions and combinations of devices, which will be hereinafter particularly described, and pointed out in the claims.

Figure 1:
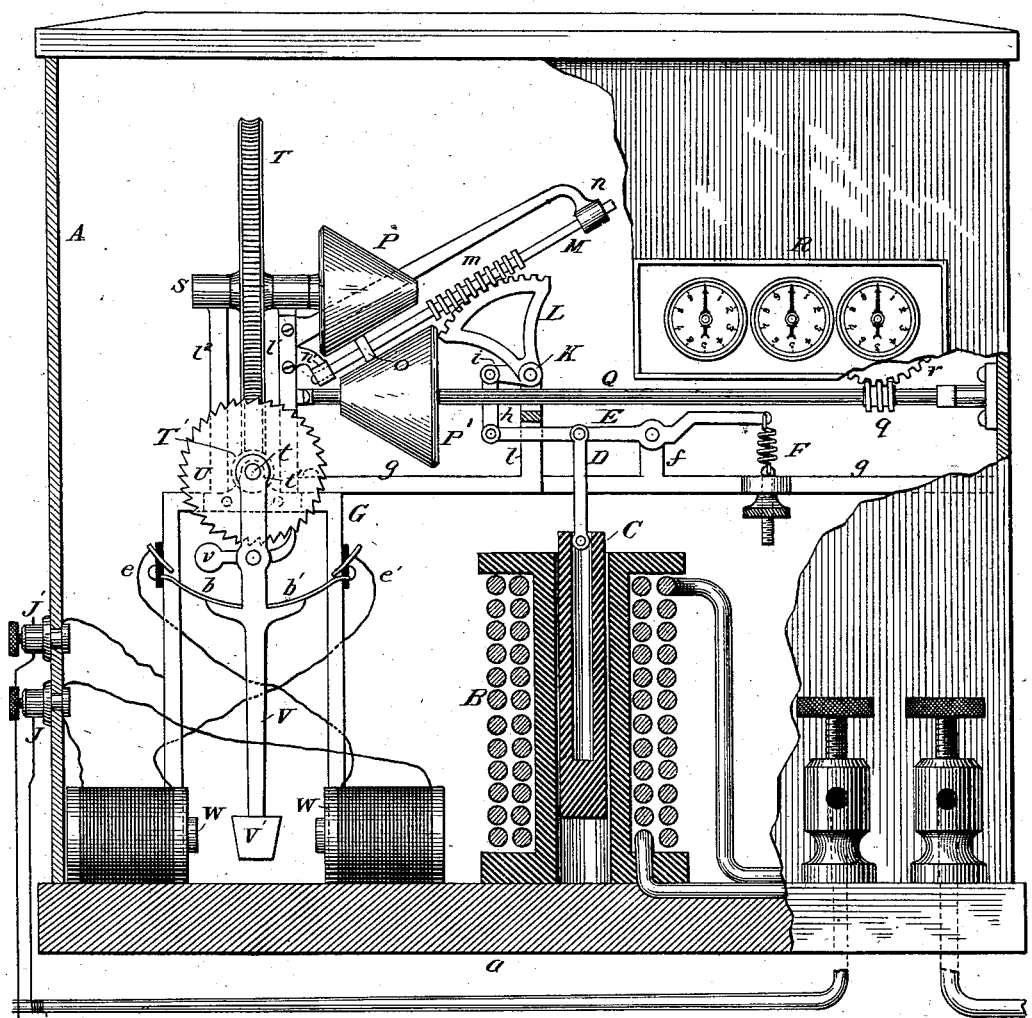
Figure 2:
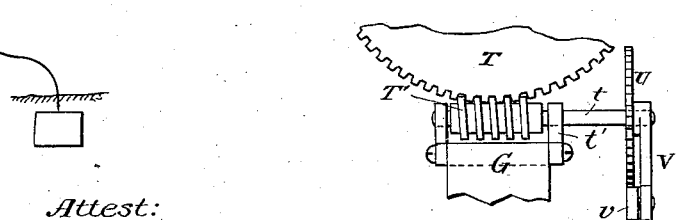

In the accompanying drawings, Figure 1 illustrates the construction of an electric meter according to my invention, a portion of the wall of the inclosing-case being removed in order to show the internal parts, and the main electro-magnet shown in section. Fig. 2 is an outline of details, hereinafter described.

The letter A designates the inclosing-case of the meter, upon the base $a$ of which is arranged in vertical position an electro-magnet, B, of low resistance, provided with an axially-movable core, C, which is connected by means of a link, D, with a lever, E, pivoted at one end to a stud, $f$, rising from a suitable supporting-bar, $g$, while its other end is connected by a link, $h$, with an arm, $i$, which is secured to a short shaft, K, journaled at the top of a post, $l$, rising from said supporting-bar $g$. To the said shaft K is secured a segmental gear, L, the teeth of which engage with a series of annular projections or flanges, $m$, upon an obliquely-arranged shaft, M, journaled in bearings $n$ and $n'$, supported by arms projecting from a post, $l'$, rising from the before-mentioned supporting-bar $g$. The shaft M is movable axially in its bearings, and also rotates therein. Upon the lower portion of said shaft is fixed a small friction-wheel, O, which is arranged between and in contact with the inclined faces of the two oppositely-arranged friction-cones, P and P', the latter of which is fixed upon a shaft, Q, which carries a worm, $q$, engaging with the prime motive wheel $r$ of a registering apparatus, R, similar in construction to those used in gas-meters. The other cone, P, is fixed upon the end of a shaft, $s$, mounted in bearings at the top of the two posts $l'$ $l^2$, and having mounted upon it between said posts a worm-wheel, T, which engages with a worm, T', behind the ratchet-wheel U, which is fixed upon the forwardly-projecting end of the worm-shaft $t$, said shaft being journaled in bearings in standards $t'$, rising from a metallic frame, G, upon which rests one end of the supporting-bar $g$.

Loosely upon the worm shaft T', in front of the ratchet-wheel U, is pivoted a pendulum-bar, V, to which is pivoted a gravity-pawl $v$, engaging the teeth of said ratchet-wheel. The lower end of this metallic pendulum-bar carries a heavy armature, V', arranged to vibrate between the poles of two oppositely-arranged electro-magnets, W W'. Just below the pawl $v$ the pendulum-bar has projecting from it in opposite directions two metallic tongue-springs, $b$ and $b'$, which, when the pendulum is vibrated, come alternately in contact with two metallic plates, $c$ and $c'$, supported by the frame G, but insulated therefrom on opposite sides of the pendulum-bar. With the metal plates connect conductors from a binding-post, J, and with the metal frame connects a conductor from a second post, J'.

W W' are two electro-magnets on opposite sides of armature V', and are wound with the conductors from J. The nature and operation of these parts will be readily understood, as they are similar to an arrangement common in electric clocks.

It is to be noted that the binding-posts J J' are connected with ends of a branched or derived circuit from the main conductor, and that one of the strips $b$ $b'$ on pendulum V is normally in contact with one of the plates $c$ $c'$, so that when a current passes over the main line a portion of it serves to operate the pendulum, causing it to oscillate, and by means of pawl $v$ to turn the ratchet-wheel U step by step. The motion communicated to the ratchet-wheel U through the pawl $v$ gives said wheel a steady motion to the left, and a similar motion to the worm T', which is carried by the shaft $t$, upon which the ratchet-wheel is fixed. This worm, through the worm-wheel T and shaft $s$, communicates rotary motion to the cone P', from which motion is transmitted through the friction-wheel O to the cone P, and through the shaft Q of said cone and its worm $q$ to the motive wheel $r$ of the registering apparatus.

The position of the wheel O between the cones P and P' regulates the speed of the motion transmitted to shaft Q and the mechanism of the registering apparatus. If the wheel O is near the large end or base of cone P', then a rapid motion will be transmitted to cone P and the shaft Q, and this transmitted motion will be slower as the wheel O is brought nearer to the apex of cone P' and base of cone P, as will be readily understood. Now, the position of the movable core C of the magnet B regulates the position of the wheel O between the two cores, for the rising and falling of said core communicates motion through the link D, lever E, link $h$, arm $i$, and shaft K to the segmental gear L, the teeth of which engage with the projections $m$ of the shaft M, these projections serving in fact as annular gear-teeth, which mesh with the teeth of the segmental gear throughout the rotation of the shaft.

When an electrical current of great power traverses the coil of magnet D the movable core C will be drawn inwardly, and through the connections, as before described, will move the segmental gear L to the left, causing the shaft M to be moved longitudinally to bring the wheel O toward the base of cone P' and apex of cone P, so that a relatively rapid motion will be transmitted to the shaft Q and mechanism of the registering apparatus, as before described. The segmental gear L is normally drawn to the right by a spring, F, which, when no current is flowing over magnet B, holds said gear in position to bring the wheel O up to the apex of cone P' and base of the cone P, and will hold it in proximity to this position, corresponding to the extent to which the movable core C is drawn inwardly by the magnet B. If a current of less power traverses the coil of the magnet, the core will be drawn in but slightly, and the wheel O will be placed at such short distance from the apex of cone P' as to cause a slow motion to be transmitted to the registering apparatus, and the variations of current strength will cause the core C and spring F to so vary the position of the segmental gear L and wheel O that the registration will vary correspondingly.

The terminals of the coil of magnet B are respectively connected with the binding-post X and X', by which the meter may be interposed in a line the electrical current upon which is to be measured.

Instead of the form of electric pendulum shown, other suitable electro-magnetic devices may be used, the present being shown only to illustrate the method of driving the meter. The character of the impelling devices, however, should be such as not to vary appreciably for varying intensities of current.

It will generally be found advantageous to employ in connection with the axial core C some means—such as an ordinary dash-pot—to prevent it from oscillating.

It may further be stated with regard to the devices for transmitting motion to the register and varying its speed that the shape of the cones P P' should be adapted to impart to the shaft Q a speed which shall be directly proportional to the strength of the current. The proper shape of the cones and the disposition of the speed-controlling devices are easily ascertained by experiment.

Having thus described my invention, what I claim is—

1. The combination, with a single electric circuit, of a meter consisting of an electro-magnetic motive device having a constant rate of speed for different degrees of current strength, a registering apparatus impelled thereby, connecting-gear capable of varying the speed of movement transmitted, and an electro-magnet and armature, in conjunction with the said gearing and adapted to regulate its action, substantially as set forth.

2. In an electric meter, the combination, with an electro-magnet provided with axially-movable core, and a registering apparatus, of the cones P' and P, the former rotated by automatic mechanism, the friction-wheel O, arranged between said cones, suitable devices connected with the core of said magnet for shifting said wheel between said cores, and mechanism for transmitting motion from the cone P to the registering apparatus, substantially as described.

3. The combination, with the magnet B, arranged for connection with the main line and provided with the axially-movable core C, of the segmental gear L, connected with said core, the axially-movable shaft M, provided with the projections $m$ and wheel O, the cone P, mounted upon the shaft Q, in gear with the registering apparatus, and the cone P', arranged for rotation by automatic mechanism, substantially as described.

4. In an electric meter, the combination, with the electro-magnets W W', the pendulum-bar V, arranged for vibration by the opposite attraction of said magnets and provided with pawl $v$, of the ratchet-wheel U, the worm mounted on the same shaft with the ratchet-wheel, the worm-wheel T, cone P', cone P, mounted on a shaft in gear with the registering apparatus, the friction-wheel O, arranged between said cones, and suitable devices arranged for operation to shift said wheel under the influence of an electrical current to be measured.

In testimony whereof I have hereunto set my hand this 14th day of July, 1881.

HIRAM S. MAXIM.

Witnesses:
W. J. VAN PELT, Jr.,
PARKER W. PAGE.